US005406978A

United States Patent [19]

Smolong

[11] Patent Number: 5,406,978

[45] Date of Patent: Apr. 18, 1995

[54] SHUTTLE ORIFICE CONTROL MECHANISM

[75] Inventor: Michael Smolong, Hamburg, Germany

[73] Assignee: Sauer Inc., Ames, Iowa

[21] Appl. No.: 182,336

[22] Filed: Jan. 18, 1994

[30] Foreign Application Priority Data

Jan. 26, 1993 [DE] Germany ........................ 43 02 036.4

[51] Int. Cl.[6] ............................................ F16K 15/04

[52] U.S. Cl. ............................ 137/516.25; 137/513.5

[58] Field of Search ......................... 137/513.5, 516.25

[56] References Cited

U.S. PATENT DOCUMENTS 3,164,141 1/1965 Jones ........................... 137/513.5 X 3,325,155 6/1967 Bahout ......................... 137/513.5 X 3,926,375 12/1975 Reeder ......................... 137/513.5 X

*Primary Examiner*—Robert G. Nilson

*Attorney, Agent, or Firm*—Zarley, McKee, Thomte, Voorhees & Sease

[57] ABSTRACT

A hydraulic fluid pressure operated control mechanism for controlling of hydraulic systems has a housing with a flow through cross-sectional area restricted by a drill hole in an open position of the control mechanism and a seat engageable by a throttle device for restricting the flow through cross-sectional area in a closed or throttling position of the control mechanism. The inwroughted seat for the throttle device is located in the conical bottom of a bore and has the form of a frustum of a pyramid having a plurality of sides.

10 Claims, 5 Drawing Sheets

SHUTTLE ORIFICE CONTROL MECHANISM

BACKGROUND OF THE INVENTION

The invention relates to a hydraulic fluid pressure operated control mechanism for use in hydraulic systems for their controlling, more specifically for use in hydraulic systems for hydrostatic transmissions comprising a variable displacement pump and a variable displacement motor.

Because of limited assembling space it is important to have hydrostatic transmissions which are compact in design. From that results that the displacement adjusting systems for such hydrostatic transmissions have to be small and therefore must be supplied with system pressure to guarantee the secure change of displacement under all operating conditions.

A disadvantage of such displacement adjusting systems is that long adjusting times, which are desirable for reducing jerkiness in vehicles having hydrostatic transmissions, are only realized with very small orifices. Unfortunately, very small orifices are susceptible to blockage by fluid-borne contaminants. It is usually important for the driving performance of a vehicle that the response time from minimum displacement to maximum displacement be different depending on whether the vehicle is moved in a forward or reverse direction. Therefore, it is desirable to have a different size orifice for each direction. Another difficulty can arise when the driver, at high driving speed, attempts to set the variable displacement motor at a large swashplate angle and the rapidly increased displacement of the motor cannot be delivered by the pump. The consequence can be an extremely abrupt deceleration of the vehicle.

The principal object of the invention is to provide a control mechanism carried out as a shuttle orifice that facilitates long response times by providing a very small open cross-sectional area, that is self-cleaning, and that is fabricable in close tolerances and in a technological simple and inexpensive way.

SUMMARY OF THE INVENTION

The hydraulic fluid pressure operated control mechanism of this invention includes a housing and is provided for controlling of hydraulic systems. The control mechanism contains in its housing a flow-through cross-section limited by a drill bore and a flow-through cross-section limited by a throttle device. The throttle device can have a variety of shapes including but not limited to that of a ball or a cone or a frustum of a cone. A seat for the throttle device is provided at the throttled position of the control mechanism. The seat for the throttle device is incorporated in a conical form which lies at the intersection of the drill-bore and the flow-through cross-section. The seat is at least partially formed in the shape of a frustum of a pyramid. The number of sides of the frustum of pyramid is three or more, and preferably three to four. Depending on the degree of formation of the frustum of the pyramid out of the conical form, the throttle device is either in point-contact when the side faces of the frustum completely define the intersection of the flow-through cross-section and the drill bore or in line-contact when the frustum only partially replaces the conical form at the above-mentioned intersection, i.e., plane areas are only shaped at the edges of the pyramid. Between the surface of the throttle device and the surface of the frustum of pyramid a small, normally open cross-section is formed that is the throttling cross-section.

The mutually impingable control mechanism can be suitably formed such that in direction of flow it has a seat upstream and downstream of the throttle device.

The throttling effect is achieved by the normally open cross-sectional area that is defined by the described geometry of the seat. The smallest flow-through cross-sectional area and with that the largest throttling effect is constituted when the throttle device lies against the seat, i.e. when the flow direction is from the throttle device to the flow-through drill-bore. The largest flow-through cross-sectional area and with that the smallest throttling effect is constituted when the throttle device is not in contact with the seat, i.e. when the flow direction is from flow-through drill-bore toward the throttle device.

The control mechanism according to this invention with the seat geometry of the seat formed in this way and the described kind of throttle device insures the very small flow-through cross-sectional areas that are necessary for long response times realized by the control mechanism in hydrostatic transmission systems. Furthermore, it is self-cleaning, and it is economically manufactured. When a seat according to this invention having one cross-sectional area is located on one side of the throttle device and a seat having another cross-sectional are is located on the other side of the throttle device differing response times can are provided for the forward and reverse directions of vehicle movement.

DESCRIPTION OF THE PREFERRED EMBODIMENT

Figure 1:
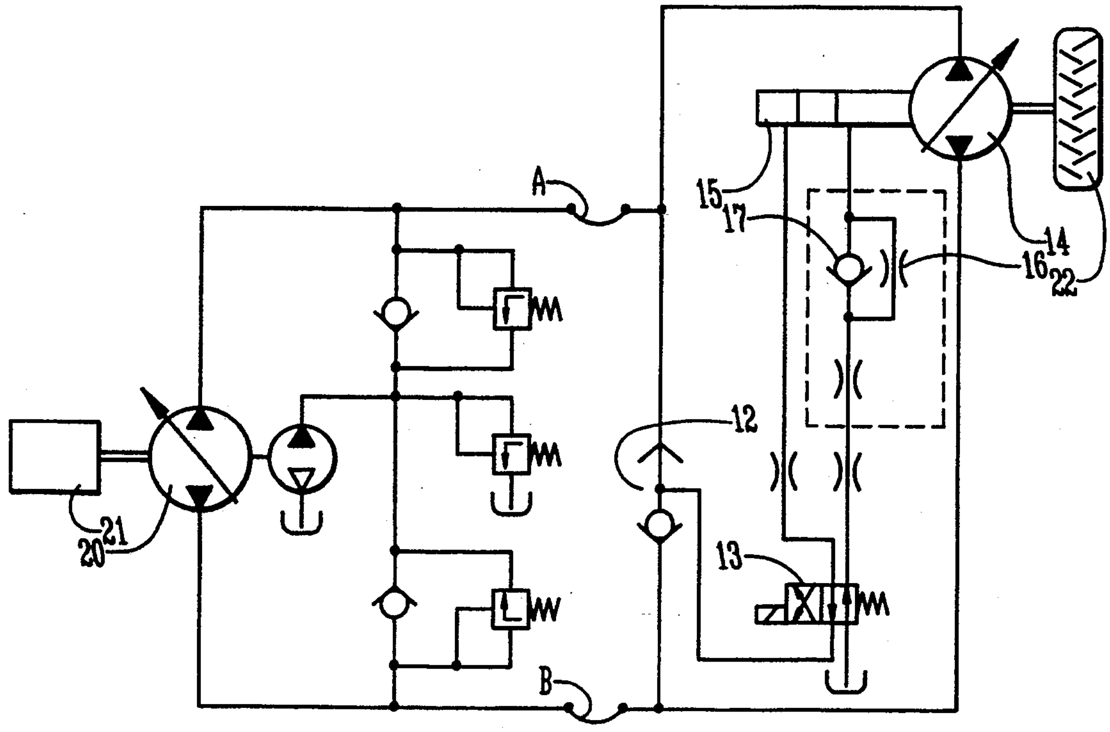
FIG. 1 is a schematic diagram of a hydrostatic transmission.

FIG. 1 shows a schematic diagram of a hydrostatic transmission, comprising a variable displacement pump 20 and a variable displacement motor 14. Typically, the transmission transmits rotary power input from an engine 21 drivingly connected to pump 20. The pump 20 supplies pressurized oil to the hydraulic motor 14 which in turn drives a wheel 22 to propel the vehicle. The pressure of the oil supply for the motor 14 is developed as a result of a bi-directional check valve 12 that is interposed between high pressure lines A and B. An electrical on/off valve 13 makes it possible to adjust the hydraulic motor to minimum or maximum displacement via a servo piston 15. Between the servo piston 15 of the motor 14 and the on/off valve 13 is provided a control mechanism which acts as a shuttle orifice 17. During adjustment to minimum motor displacement, the shuttle orifice 17 by-passes a small orifice 16 and allows short response times to displacement adjustments in this way. In FIG. 1, the on/off valve 13 is spring biased in a position wherein the motor 14 is adjusted to the maximum displacement. In this case, the shuttle orifice 17 locks and the fluid drain flow from servo piston 15 is restricted considerably because of the small orifice 16. Consequently, adjusting the motor 14 to maximum displacement occurs gradually over in a relative long time period. The response of the transmission and thereby the vehicle is relatively smooth, rather than abrupt or jerky.

Figure 2:
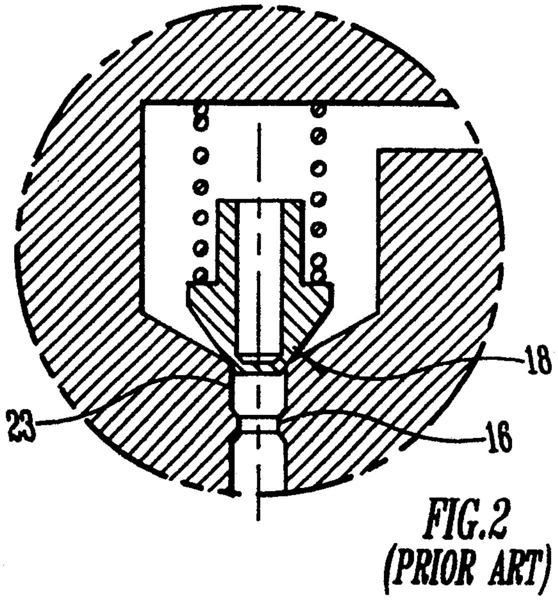
FIG.2 (PRIOR ART)
FIG. 2 shows a prior art shuttle orifice with a conical-shaped throttle devices.
Figure 3:
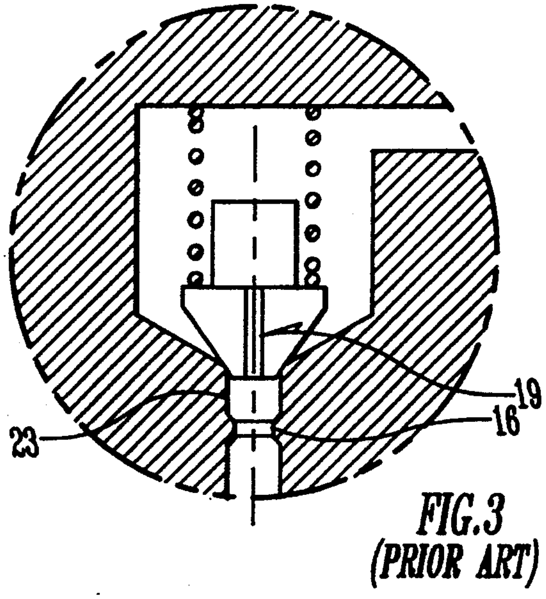
FIG.3 (PRIOR ART)
FIG. 3 shows a prior art shuttle orifice with a slit conical shaped throttle device.

FIG. 2 shows the control mechanisms which are known in the art and perform as shuttle orifices. A throttling function results either from the open flow-through cross-sectional area between the throttle device 18 and a centered throttle drillbore 23 or from a flow-through cross-sectional area 19 that is formed by a slit ground into the throttle device cone (see FIG. 3).

From the view of producibility both are expensive. Furthermore, it is difficult to manufacture the flow-through cross-sectional area in close tolerances; especially at cross-sectional areas that correspond to drill-diameter of 0.2 mm. The main advantage of the throttle device with a slit is the self-cleaning characteristic of this type as the throttle device cone lifts off at reversed flow direction and therefore soil particles can be dislodged again. That does not apply to the drill-bored type; a throttle with a 0.2 mm diameter drill-bore cannot be used because of operational reliability (danger of blockage).

Figure 4:
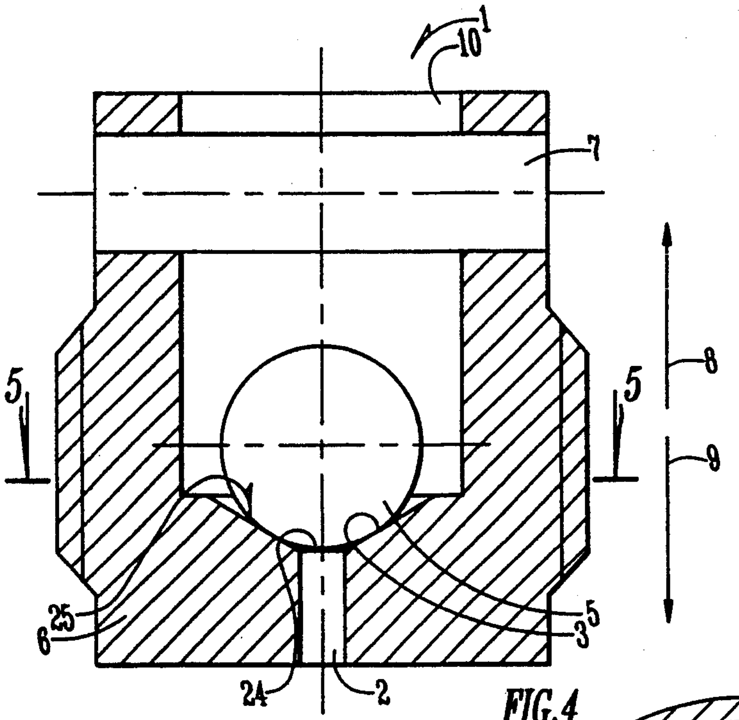
FIG. 4 shows the structure of a control mechanism carried out as shuttle orifice according to the present invention.

According to FIG. 4, the control mechanism 1 carried out as shuttle orifice includes a housing 6; an inlet cross-section 24 and a drain off cross-section 10, respectively (depending on flow direction); a conical surface 4 formed in the housing at the intersection of the drain off cross-section 10 and a flow through cross-sectional area 2; a frustum of a regular pyramid 3 formed into the conical surface 4 (see FIG. 5) with four plain side faces so as to form a seat 25 for a throttle device 5; and wherein a ball acts as the throttle device 5 and a cross pin 7 prevents the ball from falling out of the control mechanism. A spring 11 can be provided (see FIG. 6) for pressing the ball 5 against the seat 25 (see FIG. 6).

When the flow is in the direction denoted by reference numeral 9, the ball 5 is in contact with the seat 25. With the ball 5 seated, the effective flow-through cross-sectional area is geometrically defined as the sum of the open areas or gaps between the points where the surface of the ball contacts the side planar faces of the pyramid frustum and the planar surfaces of the frustum of pyramid 3 in the plane that yields the smallest cumulative geometrical cross-section.

For the flow direction 8, when the ball 5 is not in contact with the seat 25, the effective flow-through cross-sectional area is defined as the normally open area between the spherical surface of ball 5 and the pyramidal surface in the plane that yields the smallest cumulative geometrical cross-section. Alternatively, the inlet cross section 24 of the drill-bore in center of the seat, depending on its diameter, may be the limiting or smaller flow-through cross-sectional area.

Between these two ball positions, opened shuttle orifice (flow direction 8) and fully throttling position (flow direction 9 and ball 5 in contact with the seat 25), the flow-through cross-section adapts itself to the flow conditions through the shuttle orifice.

From the view of fabrication, this shuttle orifice control mechanism dwells in the simple manufacturing of the seat of the throttle device preferably by a stamping process using a pyramid-shapeed stamping tool. The stamping process tolerances are largely controllable through the accurate manufacture of the stamping tool in series manufacturing. Commercial ball bearings are readily available at a reasonable cost with diametrical tolerances in the range of a few micrometers such that variations due to the ball are also negligible.

This invention results in a shuttle orifice that has significant advantages from the view of manufacturing, and in a small throttling position the ball lifts off of the seat, which expands the extremely small flow-through cross-sections and makes the shuttle orifice self-cleaning.

Figure 5:
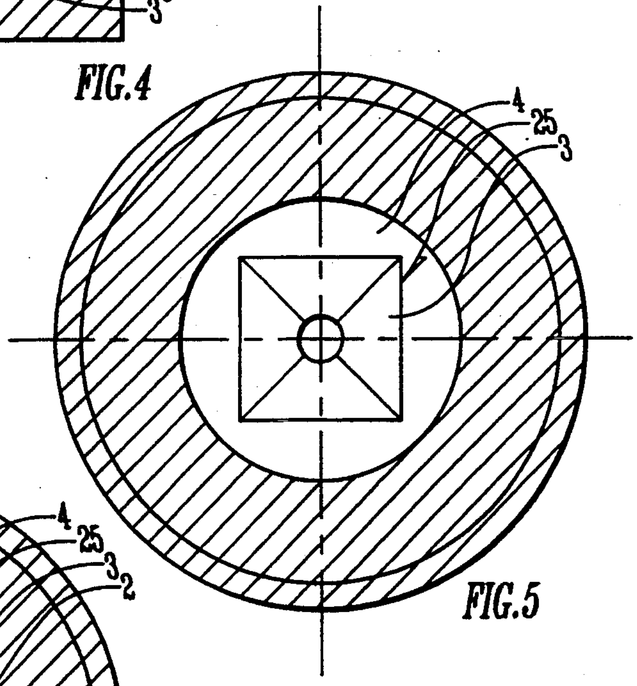
FIG. 5 is a sectional view taken along line 5—5 of FIG. 4 showing the pyramid-shaped seat of this invention.
Figure 6:
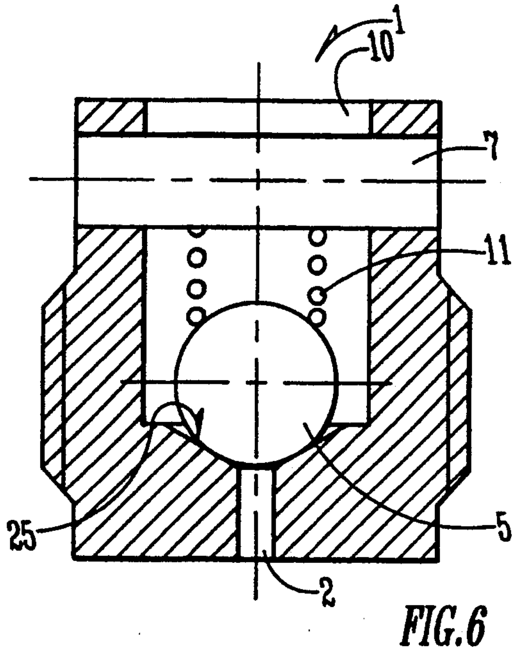
FIG. 6 shows the structure of a control mechanism carried out as shuttle orifice according to invention with a spring for pressing the ball against the seat.

Another embodiment of the present invention is realized when throttle device 18 of FIG. 2, having a conical shape or the shape of a frustum of a cone, is combined with the pyramid-shaped seat 25 of FIG. 5.

Figure 5A:
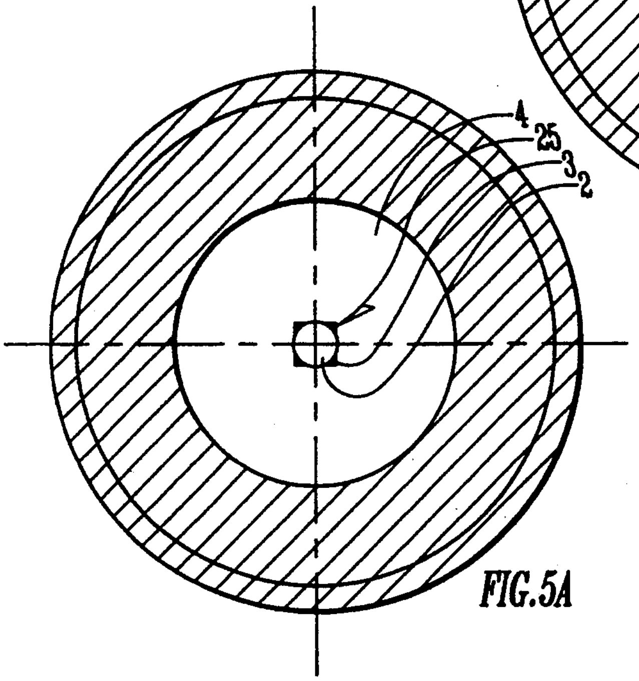
FIG. 5A is a sectional view similar to FIG. 5, except that the seat is only partially inwrought.

FIG. 5A shows an alternate embodiment of the present invention wherein the seat 25 comprises a frustum of a pyramid which is only partially inwrought in conical surface 4.

Figure 6A:
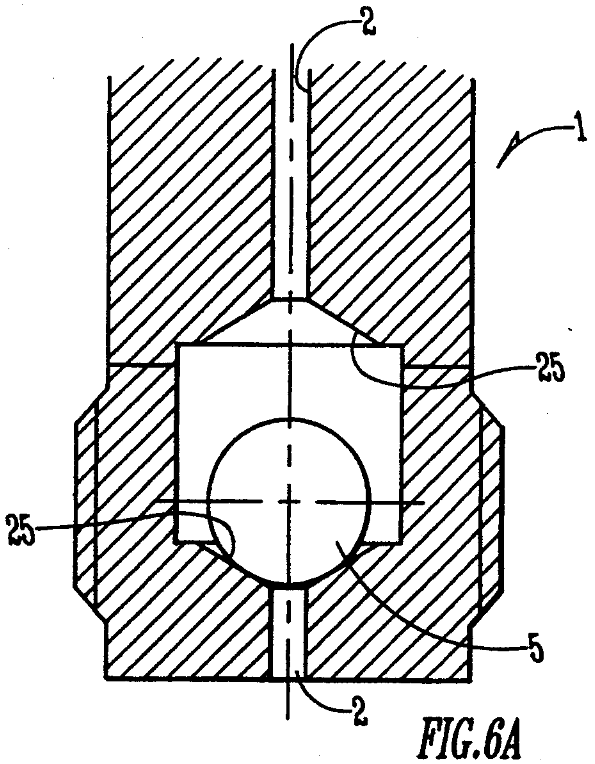
FIG. 6A is a sectional view similar to FIG. 6, except a plural valve seat structure is shown.

FIG. 6A shows another embodiment of the invention wherein a pair of valve seats 25 is disposed one on either side of the throttle device 5 and between flow through cross-sectional areas 2. Flow in either direction forces the throttle device 5 into contact with whichever seat 25 is downstream of the flow.

Figure 7:
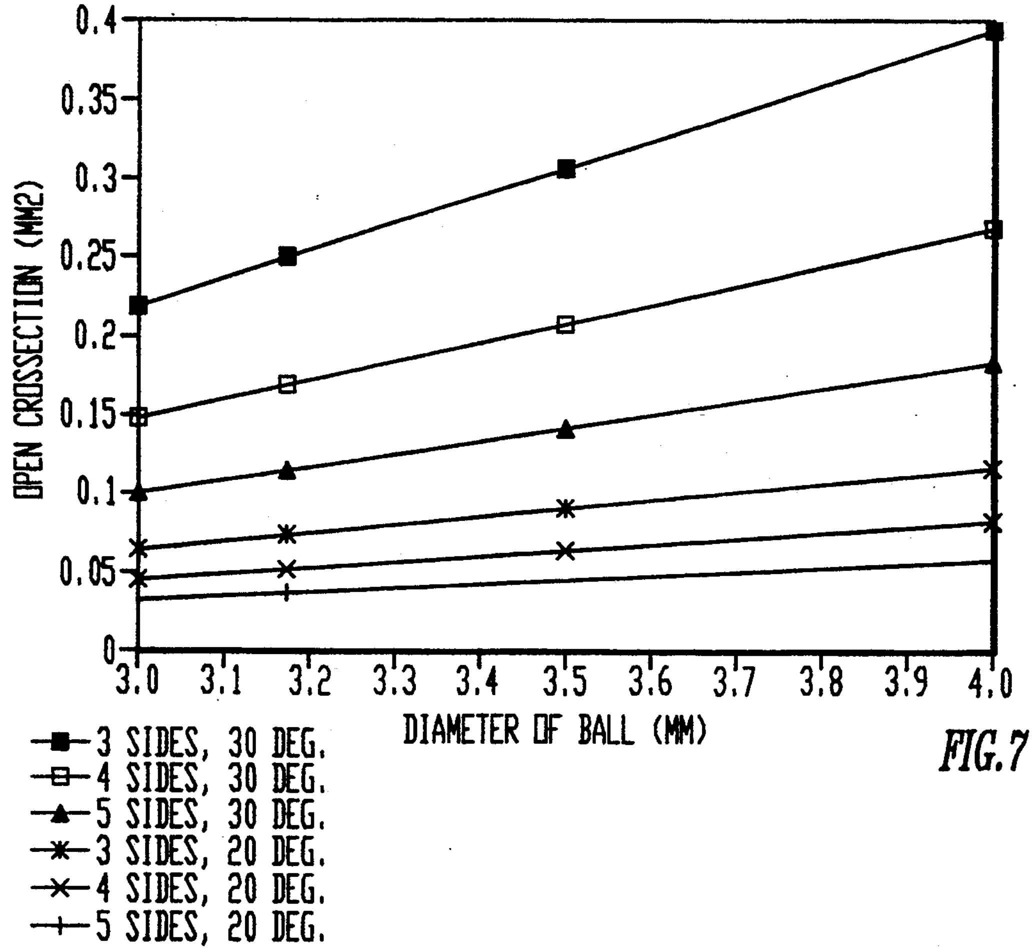
FIG. 7 is the graph showing the dependence of the cross-sectional flow-through area of the throttle on the number of sides of the pyramid, the rake angle of the side faces of the pyramid to its base and the ball diameter.

FIG. 7 shows the open area of the throttle as a function of the number of sides of the pyramid, the rake angle of the sides from horizontal, and the ball diameter in millimeters.

I claim:

1. A hydraulic fluid pressure operated control mechanism for controlling of hydraulic system, said mechanism comprising:

a housing having first and second fluid ports therein;

an elongated throttle bore having first end fluidly connected to said first fluid port and a concave conical bottom disposed at a second end;

an elongated drill hole having one end connected to said second fluid port and another end intersecting said throttle bore, said drill hole having a cross-sectional area;

an inwroughted seat formed in said conical bottom adjacent to said intersection of said drill hole and said throttle bore, said seat having the form of a frustum of a pyramid having a plurality substantially of planar sides; and a throttle device for restricting the flow through said cross-sectional area by incomplete blocking engagement with said intersection.

2. The control mechanism of claim 1 wherein said seat is inwroughted into said conical bottom such that said conical bottom is effectively supplanted by said seat at said intersection so that said throttle device engages said planar sides at a single seating point on each of said planar sides.

3. The control mechanism of claim 1 wherein said seat is partially inwroughted into said conical bottom such that said conical bottom defines a portion of the intersection so that said throttle device engages said conical bottom along at least one curvilinear line of contact.

4. The control mechanism of claim 1 wherein the frustum of the pyramid of the seat comprises at least three planar faces.

5. The control mechanism of claim 1 wherein the frustum of the pyramid of the seat comprises at least four planar faces.

6. The control mechanism of claim 1 wherein the throttle device has a curvilinear exterior surface.

7. The control mechanism of claim 1 wherein the throttle device is a ball.

8. The control mechanism of claim 1 wherein the throttle device is a valve cone.

9. The control mechanism of claim 1 wherein the throttle device is a frustum of a valve cone.

10. The control mechanism of claim 1, further comprising:

a concave conical top in said first end of said throttle bore;

an inwroughted seat formed in said conical top adjacent to an intersection of said first port and said throttle bore, said seat having the form of a pyramid having a plurality of substantially planar sides; and said throttle device being disposed between said top and bottom seats for selectively blocking engagement with one of said first fluid port and said intersection.

* * * * *